Aug. 8, 1967  R. J. DIEFENDORF  3,335,345
HIGH TEMPERATURE CAPACITOR
Filed Oct. 21, 1964
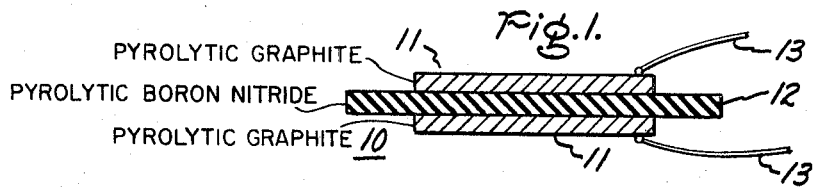
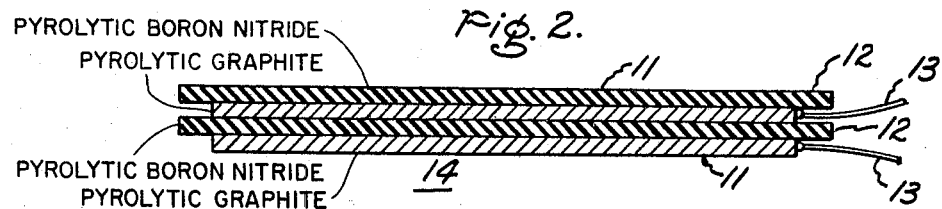
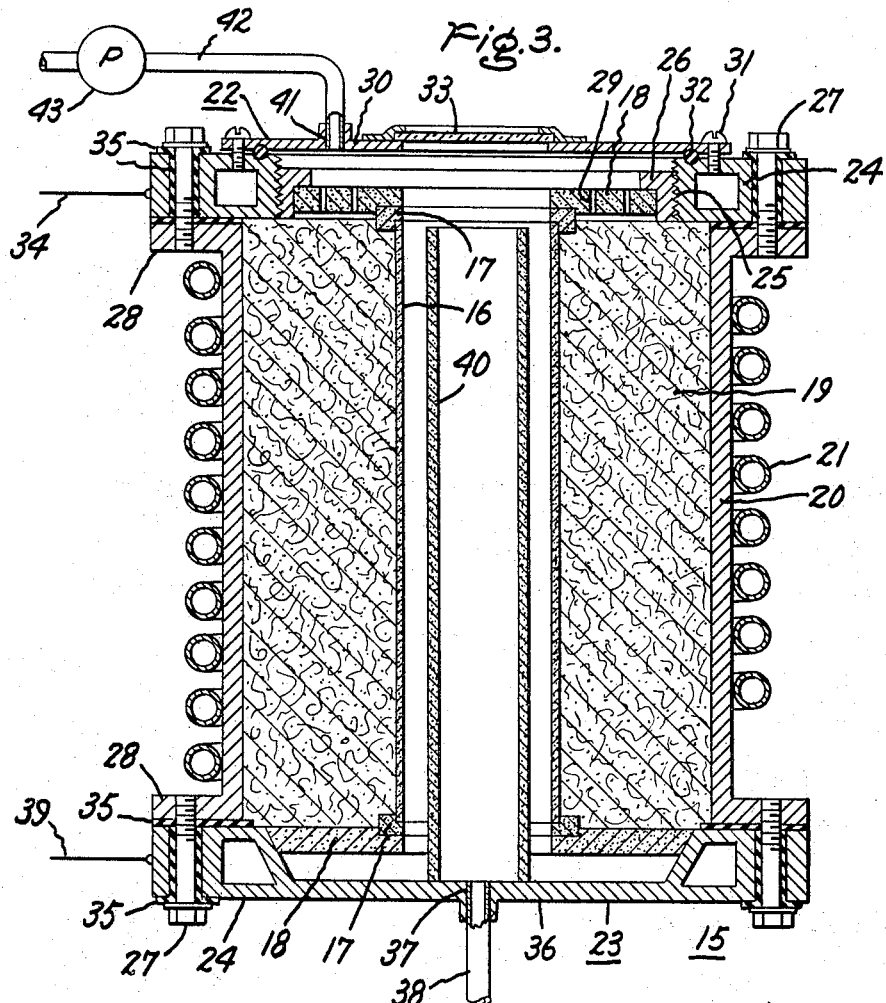
Inventor:
Russell J. Diefendorf,
by Paul R. Webb, II
His Attorney.

United States Patent Office 3,335,345
Patented Aug. 8, 1967

3,335,345
HIGH TEMPERATURE CAPACITOR
Russell J. Diefendorf, Ballston Spa, N.Y., assignor to General Electric Company, a corporation of New York
Filed Oct. 21, 1964, Ser. No. 405,421
2 Claims. (Cl. 317—258)

This invention relates to capacitors and more particularly to capacitors operable at elevated temperatures.

Present high temperature capacitors operate at temperatures up to about 600° C. maximum. Capacitors, which operate at temperatures up to about 1000° C. are desirable for employment in electronic circuitry operating at such elevated temperatures. My invention is directed to such an improved capacitor which operates at elevated temperatures up to about 1000° C.

It is an object of my invention to provide an improved capacitor which is operable up to 1000° C.

It is another object of my invention to provide an improved capacitor which employs pyrolytic graphite electrodes.

It is a further object of my invention to provide an improved capacitor which employs a boron nitride dielectric between the electrodes.

It is a still further object of my invention to provide an improved capacitor which is formed pyrolytically.

In carrying out my invention in one form, a capacitor comprises a first pyrolytic graphite electrode, a pyrolytic boron nitride dielectric positioned on the first electrode, a second pyrolytic graphite electrode positioned on the dielectric, and an electrical lead connected to each of the electrodes.

These and various other objects, features, and advantages of the invention will be better understood from the following description taken in connection with the accompanying drawing in which:

FIGURE 1 is a sectional view of an improved capacitor embodying my invention;

FIGURE 2 is a sectional view of a modified capacitor embodying my invention; and FIGURE 3 is a sectional view of apparatus for forming the electrodes and dielectric of the capacitor.

Pyrolytic graphite is defined as a material made from carbonaceous gases by thermal decomposition or from a carbonaceous material by evaporation and deposition on a surface. Pyrolytic boron nitride is defined as a material made from gases by thermal decomposition or from materials formed by evaporation and deposition on a surface. In both pyrolytic graphite and pyrolytic boron nitride, planar crystallites have a preferred orientation and are arranged so that their layers are generally parallel to the deposition surface. Pyrolytic graphite or pyrolytically-deposited graphite is an electrically conductive material while pyrolytic boron nitride or pyrolytically-deposited boron nitride is an electrically insulating material which is suitable for a dielectric.

In FIGURE 1 of the drawing, a capacitor is shown generally at 10 which comprises a pair of pyrolytic graphite electrodes 11 and a pyrolytic boron nitride dielectric 12 positioned between and in contact with the opposite surfaces of electrodes 11. An electrical lead 13 is shown connected by any suitable manner to each of the electrodes 11.

Each pyrolytic graphite electrode 11 and pyrolytic boron nitride dielectric 12 is shown in the form of a layer, each of the layers being parallel to the other layers in capacitor 10 and each layer composed of a plurality of individual layers of its respective material. Dielectric layer 12 is positioned or stacked on electrode 11 while second electrode 11 is positioned on layer 12 to form the capacitor structure. Layer 12 of pyrolytic boron nitride extends beyond the respective edges of pyrolytic graphite electrodes 11 to prevent arching over between the electrodes. Electrodes 11 are cut to smaller dimensions than the dielectric 12 so that dielectric 12 extends beyond the respective edges of electrodes 11. Additionally, if it is desired electrodes 11 and dielectric 12 are initially of the same dimensions. The edges of electrodes 11 are then etched away by any suitable means such as oxidizing. Since pyrolytic boron nitride oxidizes at a much slower rate than pyrolytic graphite, this method is successful to produce the greater diameter for dielectric 12. When this structure is stacked, electrode 11 and dielectric 12 are then held together in any suitable manner such as by clamping together or by bonding electrodes 11 to the dielectric 12. Leads 13 are then affixed to electrodes 11 to form capacitor 10.

Additionally, FIGURE 1 is also viewed as a capacitor 10 comprising a first pyrolytic graphite electrode 11 on the upper surface of which is pyrolytically deposited a boron nitride dielectric 12. A pyrolytic graphite electrode 11 is then deposited on the upper surface of boron nitride dielectric 12. Leads 13 are then attached to respective electrodes 11. If the boron nitride dielectric and the pyrolytic graphite electrodes are pyrolytically deposited to form these layers, the edges of the electrodes are then oxidized so that the boron nitride dielectric extends over the edges of the electrodes to prevent arcing.

In FIGURE 2 of the drawing there is shown a modified capacitor or capacitor roll 14 which comprises a first layer of pyrolytic graphite 11, a second layer of pyrolytic boron nitride 12 on the surface of layer 11, a second layer of pyrolytic graphite 11 on boron nitride layer 12, and a layer of electrical insulation in the form of a pyrolytic boron nitride 15 on the second pyrolytic graphite layer, and an electrical lead 13 connected to each of the pyrolytic graphite layers.

As in FIGURE 1 of the drawing, the respective pyrolytic graphite layers 11 are the electrodes of the structure, while first boron nitride layer 12 is the dielectric. The second layer of pyrolytic boron nitride 12 is a layer of electrical insulation. These layers are stacked in a similar manner to the device shown in FIGURE 1. The layers are held together in a similar fashion and rolled counterclockwise from left to right in FIGURE 2 whereby insulation 12 is provided between each layer assembly of electrodes 11 and dielectric 12. Additionally, each of these layers is pyrolytically deposited to form capacitor roll 14 in a manner similar to that described above for FIGURE 1. The electrodes are reduced in dimensions so that the dielectric and the insulation extend over the edges of the electrodes. Electrical leads are affixed then to electrodes 11.

While it is not shown in FIGURE 2 of the drawing, a plurality of capacitor rolls 14 as shown in FIGURE 2 and then rolled into tubular form are positioned within a container. Electrical insulation is positioned then between the exterior surfaces of the rolls and the interior surface of the container. The pyrolytic graphite layers of each of the rolls are connected electrically, and a pair of terminal leads are connected to associated pyrolytic graphite layers and extend through the container to form a capacitor.

I discovered that a capacitor which would operate at temperatures up to about 1000° C. could be formed from a first pyrolytic graphite electrode, a pyrolytic boron nitride dielectric positioned on the pyrolytic graphite electorde, a second pyrolytic graphite electrode positioned on the dielectric, and an electrical lead connected to each of the electrodes.

I found further that such a capacitor could comprise a first pyrolytic graphite electrode, a pyrolytically-deposited boron nitride dielectric on one surface of the electrode, a pyrolytically-deposited graphite electrode on the boron nitride dielectric, and an electrical lead connected to each of the electrodes. Thus, such a capacitor construction would include the stacking of at least two pyrolytic graphite electrodes, with a pyrolytic boron nitride dielectric theerbetween or such a structure wherein at least two pyrolytically-deposited graphite electrodes had an alternate pyrolytically deposited boron nitride dielectric therebetween.

Additionally, I found that a capacitor roll could comprise a layer of pyrolytic graphite, a layer of pyrolytic boron nitride on the pyrolytic graphite layer, a second layer of pyrolytic graphite on the boron nitride layer, a layer of electrical insulation on the second pyrolytic graphite layer, and an electrical lead connected to each of the pyrolytic graphite layers. Such a structure is then rolled and stacked with a number of similar rolls in an insulated container to provide a capacitor.

Additionally, such a roll could be formed by the pyrolytic deposition of the graphite and the boron nitride. The layer of insulation of such a structure is preferably pyrolytic boron nitride.

Each of the above capacitor structures has a high dielectric strength and a high breakdown voltage. Additionally, these capacitors have the advantage which is lacking in a silver-mica capacitor in that the latter type of capacitor is useful up to a maximum temperature of about 580° C. My capacitor will operate at lower temperature ranges and also is highly desirable in that it will operate up to temperatures of about 1000° C.

In FIGURE 3 of the drawing, apparatus is shown generally at 15 which comprises a central heating element 16 of high temperature material in the form of a hollow tubular configuration of commercial graphite. Other solid or hollow configurations of high temperature material may also be employed for the heating element. At each end of heating element or tube 16 is positioned a pyrolytic graphite electrode 17 in mechanical and electrical contact therewith. Each of these electrodes 17 is shown in the form of a ring with a flange fitting against the end of tube 16. However, any suitable electrode configuration can be employed. A graphite electrode 18 which has a larger length-to-area ratio for the electric current path is positioned adjacent electrode 17 and in electrical contact therewith. In this figure of the drawing, pyrolytic graphite electrode 17 and graphite electrode 18 form an electrode assembly for constant heating of graphite tube 16 during the operation of furnace apparatus 15.

Tube 16 is insulated from heat loss by suitable insulation 19 in the form of a blanket of graphite felt or thermal black. Since furnace 15 is adapted to be employed as a vacuum furnace, an outer metallic casing 20, for example, of brass, is positioned around insulation 19. Casing 20 is suitably cooled by water coils 21 surrounding the casing. At opposite ends of the casing 20, there is provided end cover structures 22 and 23 which each include a water-cooled electrode 24 in electrical contact with electrode 18. Electrode 24 is threaded at its inner periphery 25. An inner ring member 26 is threaded to threads 25 of electrode 24. A plurality of bolts 29 are inserted through openings in cover 22 and threaded into openings in upper flange 28 of casing 20 to mechanically position upper graphite electrode 18 against electrode 17. Upper electrode 18 is also provided with a plurality of openings 29 to provide passageways to insulation 19. A plate 30 is affixed as by screws 31 to the upper surface of member 25. An O ring 32 is provided near the outer periphery of plate 30 to produce an effective seal. A viewing window 33 is shown positioned centrally in plate 30.

An electrical lead 34 is shown in electrical contact with water-cooled electrode 24. The lead is connected to one terminal of a power source (not shown). Cover 22 is secured to the upper end of casing 20 by means of a plurality of bolts 27 which are inserted through a plurality of openings in cover 22 and which are threaded in threaded openings in a flange 28 on the upper end of casing 20. Electrically and thermally insulating material 35 is provided between cover 22 and flange 28, and within and surrounding openings in cover 22.

Lower cover 23 has a water-cooled electrode 24 near its outer periphery. Cover 23 has a central plate portion 36 wih an aperture 37 therein centrally located into which a feed line 38 is affixed. A plurality of bolts 27 are inserted through openings in lower cover 23 and are threaded in threaded openings in lower flange 28 of casing 22 to secure lower cover 23 to casing 22. Insulation 35 can also be provided between cover 23 and flange 28 and within and surrounding the openings in cover 23. A second lead 39 is connected to water-cooled electrode 24 in cover 23 and to the other terminal of the power source (not shown) to complete the electrical circuit to the furnace. The inner periphery of the water-cooled electrode 24 is tapered inwardly towards casing 20 to provide support for graphite electrode 18 which is tapered in similar fashion and fits thereagainst.

Feed line 38 is connected to material sources (not shown), for example, for boron containing materials, nitrogen containing materials, and hydrocarbon materials which it is desired to introduce into a graphite tube 40 positioned within tube 16. With such a tube 40 in position, the gas flows from inlet line 38 into the interior of tube 40. At the upper end of furnace 15 an opening 41 is provided, for example, through plate 30 of cover 22. A tube 42 is positioned in opening 41 and connected to a pump 43 to provide for evacuation of furnace 15 to a desired subatmospheric condition during operation. Additional feed lines (not shown) may be employed and connected to separate material sources.

In the operation of furnace 15 shown in FIGURE 3 of the drawing, a thin tube 16 of graphite infiltrated with pyrolytic graphite is employed. A pair of pyrolytic graphite electrodes are applied at opposite ends of tube 16. Commercial graphite electrodes 18 are positioned in contact with electrodes 17 to form electrode assemblies. A blanket of insulation such as carbon felt 19 is wrapped around the tube 16. This structure is fitted into casing 20, for example, through an open upper end of the casing with lower cover 23 already attached. Subsequently, bolts 27 are inserted through the openings in cover 22 and threaded into the openings in flange 28 of casing 20. The chamber atmosphere is reduced preferably to the lowest obtainable vacuum prior to admitting a gas, although the deposition process can be carried out over a wide range of chamber pressures such as 0.1 millimeter of mercury to 760 millimeters of mercury, at various gas flow rates. If desired, the interior of tube 40 may be purified by a preheat treatment at a temperature of at least 2350° C. This preheating is described in U.S. Patent 3,138,435 issued June 23, 1964, and assigned to the same assignee as the present application.

In one method of forming a capacitor in accordance with the present invention pyrolytic graphite electrodes are formed by depositing a layer of pyrolytic graphite on the interior surface of tube 40, removing subsequently this layer from tube 40, for example, by chemically etching away the tube from the pyrolytic graphite layer, and machining the layer to appropriate sizes to provide pyrolytic graphite electrodes.

In the formation of this pyrolytic graphite layer on the interior surface of tube 40, sufficient power is generated to heat tube 16 and tube 40 rapidly to a temperature in the range of 1200° C. to 2100° C. This temperature range is desirable to produce a uniform pyrolytic graphite layer which is removed readily from the plates. A carbonaceous gas, such as methane, is fed through appropriate metering devices (not shown) and a preheater (not shown) and feed line 38 into the interior of tube 40. While a carbonaceous gas, such as methane, ethane, propane, acetylene, benzene, carbon tetrachloride, or cyanogen is employed, the carbonaceous material can also be in liquid or solid form which is fed from the source to a preheater from conversion to a carbon vapor.

The gas is decomposed to a carbon vapor which deposits as a pyrolytic graphite layer on the interior surface of tube 40. The deposited layer is composed of a plurality of individual generally parallel pyrolytic graphite layers.

Additionally, the gas can be preheated from a separate heat source to the desired temperature to provide a carbon vapor which flows through feed line 38 into tube 40. During the operation of apparatus 15, temperatures are recorded by an optical pyrometer (not shown) which is viewed through window 33 in cover 22 of apparatus 15. At the above mentioned temperatures, it is possible to form 20 to 40 mils of pyrolytic graphite an hour. After the desired thickness of the pyrolytic graphite layer is obtained, the gas flow is stopped, the pressure is decreased further, and the apparatus is allowed to cool to room temperature. The pressure is increased subsequently to atmospheric pressure, and cover 22 is unbolted from casing 15. The apparatus is disassembled to remove coated tube 40 from tube 16 in furnace 15. The pyrolytically-deposited graphite layer is then removed from the interior surface of tube 40 as discussed above. The pyrolytically-deposited layer is then machined to the desired size to provide a plurality of graphite electrodes 11.

The same apparatus shown in FIGURE 3 is then employed to provide a pyrolytically-deposited boron nitride layer on the interior surface of tube 40 in a similar manner. Power is generated to heat tube 16 and tube 40 rapidly to a temperature in the range of 1400° C. to 2000° C. prior to admitting the gas. A boron and nitrogen component gas, such as B-trichlorborazole, which has been heated to a temperature of 80° C., is fed through suitable metering devices (not shown) and feed line 38 into the interior of tube 40. The gas is decomposed to a vapor which deposits as a pyrolytic boron nitride layer on the interior surface of tube 40. This layer is composed of a plurality of individual generally parallel boron nitride layers. This temperature range and the above pressure range are desirable to produce individual fine-grain pyrolytic boron nitride layers. In addition to B-trichlorborazole, $B_3N_3H_3Cl_3$, which provides both the boron and nitrogen components, various starting materials such as $BCl_3$ or $B_2H_6$ are suitable to provide the boron compound while $NH_3$ is suitable to provide the nitrogen compound. Additionally, the gas can be preheated from a separate heat source to the desired temperature to provide a vapor which flows through feed line 38 into tube 40.

After the desired thickness of the pyrolytic boron nitride layer is obtained, the gas flow is stopped, the pressure is decreased further, and the apparatus is allowed to cool to room temperature. The pressure is increased subsequently to atmospheric pressure, and cover 22 is unbolted from casing 15. The apparatus is disassembled to remove coated tube 40 from tube 16 in furnace 15. The deposited layer is then removed from the interior surface of tube 40 as discussed above. The pyrolytic boron nitride layer is then machined to appropriate sizes to provide a plurality of dielectrics 12.

After both the pyrolytic graphite electrodes have been machined to size, and the boron nitride layer has been machined to size, the capacitor in FIGURE 1 is assembled. A pair of pyroltic graphite electrodes 11 have a pyrolytic boron nitride dielectric 12 positioned therebetween and in contact with the surfaces of electrodes 11. An electrical lead 13 is connected to each of the electrodes 11 in any suitable manner. As is shown in FIGURE 1 of the drawing, the pyrolytic boron nitride dielectric 12 extends beyond the respective edges of electrodes 11 to prevent arcing between the electrodes. This is accomplished as discussed above by cutting the dielectric to a larger size than the electrodes. The electrodes 11 and dielectric 12 are clamped together or bonded together in any suitable manner. If electrodes 11 and dielectric 12 are initially of the same dimensions, the electrodes are etched away at their edges as by oxidizing to provide the dielectric layer extending beyond the edges of the electrodes.

In addition to stacking the electrodes and dielectric to form a capacitor shown in FIGURE 1, the apparatus in FIGURE 3 may be employed also to produce directly this type of structure wherein the layers are pyrolytically deposited to form a capacitor. As it was discussed above in connection with the operation of the apparatus shown in FIGURE 3, a capacitor construction such as shown in FIGURE 1 may be produced in a continuous manner by first depositing pyrolytic graphite from a carbonaceous vapor onto the interior surface of tube 40 to a desired thickness. The gas is then stopped. Since the deposition temperatures for pyrolytic graphite and pyrolytic boron nitride overlap substantially, the temperature is maintained constant for the entire process or lowered to a temperaturere in the range of 1400° C. to 2000° C. A boron and nitrogen component gas is fed through feed line 38 to the interior of tube 40 to produce a pyrolytically-deposited boron nitride layer on the first pyrolytic graphite layer. The gas is then stopped. Similarly, the temperature is maintained constant or raised in the temperature range of 1200° C. to 2100° C. The initial carbonaceous gas is then flowed into tube 40. A second pyrolytic graphite layer is then deposited on the pyrolytically-deposited boron nitride layer.

As it was described above after the deposition is completed, tube 40 is removed from the apparatus and a composite structure consisting of a first layer of pyrolytic graphite, a second layer of pyrolytically-deposited boron nitride on the graphite layer, and a second layer of pyrolytic graphite deposited on the boron nitride layer are removed from the interior surface of tube 40, for example, by chemically etching away tube 40 in a concentrated solution of sulfuric acid. The composite structure is then machined to appropriate sizes to provide a plurality of capacitor structure. The opposite pyrolytic graphite layers, which are the electrodes for each capacitor, are etched away so that the boron nitride layer extends beyond the respective edges of the electrodes to prevent arcing. A pair of leads are then connected to the electrodes to complete the capacitor structure.

As it was described above in connection with FIGURE 2 of the drawing, a capacitor or capacitor roll is formed from a stack comprising a layer of pyrolytic graphite, a layer of boron nitride positioned on the pyrolytic graphite layer, a second layer of pyrolytic graphite positioned on the boron nitride layer, a layer of electrical insulation, such as boron nitride positioned on the second pyrolytic graphite layer, and an electrical lead connected to each of the pyrolytic graphite layers. This material is produced in the apparatus in FIGURE 3 and the layers stacked upon one another and clamped or bonded in any suitable manner. The edges of the dielectric and the insulation extend over the edges of the electrodes to prevent arcing and are provided in this manner by etching away of the electrodes or different dimensioning for the electrodes, the dielectric and the insulation.

The capacitor or capacitor roll 14 which is shown in FIGURE 2 is then rolled counterclockwise from left to right as shown in the figure whereby insulation 12 is provided between each layer assembly of electrodes 11 and dielectric 12. A plurality of these rolls may be positioned in an insulated container wherein the rolls are connected electrically, and a pair of terminal leads are connected to the pyrolytic graphite electrodes and extends through the container forming a capacitor.

In addition to stacking the electrodes, dielectric, and insulation in the form of a capacitor shown in FIGURE 2, apparatus in FIGURE 3 may also be employed to produce directly a capacitor structure wherein the layers are pyrolytically-deposited to form a capacitor or capacitor roll 14. As it was discussed above in connection with the operation of the apparatus shown in FIGURE 3, the capacitor construction as shown in FIGURE 2 is produced in a continuous manner by first depositing pyrolytic graphite from a carbonaceous vapor onto the interior surface of tube 40 to a desired thickness. The gas is then stopped. The temperature is maintained constant or lowered to a temperature in the range of 1400° C. to 2000° C. A boron and nitrogen component gas is fed through feed line 38 to the interior of tube 40 to produce a pyrolytically-deposited boron nitride layer on the first pyrolytic graphite layer. The gas is then stopped. The temperature is maintained constant or raised to a temperature in the range of 1200° C. to 2100° C. The initial carbonaceous gas is then flowed into tube 40. A second pyrolytic graphite layer of desired thickness is then deposited on the pyrolytically-deposited boron nitride layer. The gas is then stopped. The temperature is maintained constant or lowered to a temperature in the range of 1400° C. to 2000° C. The initial boron and nitrogen component gas is fed through feed line 38 to tube 40 to produce a pyrolytically-deposited boron nitride layer of desired thickness on the second pyrolytic graphite layer.

As it was described above after the deposition is completed, tube 40 is removed from the apparatus and a composite structure consisting of a first layer of pyrolytic graphite, a second layer of pyrolytically-deposited boron nitride on the graphite layer, a second layer of pyrolytic graphite deposited on the boron nitride layer, and a second layer of pyrolytic boron nitride deposited on the second pyrolytic graphite layer are removed from the interior surface of tube 40, for example, by chemically etching away tube 40 in a concentrated solution of sulfuric acid. The composite structure is machined to appropriate sizes to provide a plurality of capacitor structures. The pair of pyrolytic graphite layers, which are the electrodes for the capacitor, are etched away so that the boron nitride layers extend beyond the respective edges of the electrodes to prevent arcing. A pair of leads are then connected to the electrodes to complete the capacitor structure. This capacitor 14 or capacitor roll is then rolled counterclockwise from left to right as shown in FIGURE 2, whereby insulation 12 is provided between each layer assembly of electrodes 11 and dielectric 12. If desired, a plurality of these rolls are positioned in an insulated container and connected electrically. A terminal lead is connected to each of the pyrolytic graphite electrodes and extends through the container to form a capacitor.

Examples of capacitors formed in accordance with the present invention were as follows:

EXAMPLE I

Apparatus was set up in accordance with FIGURE 3 of the drawing wherein the deposition tube was composed of commercial graphite. The cover was bolted to the casing and the chamber defined by the deposition tube was reduced to a pressure of 0.010 millimeter of mercury by the pump. Power was supplied which heated the tube and tube passage to an uncorrected optimal pyrometer temperature reading of about 1650° C. A carbonaceous gas in the form of methane was supplied at a rate of 0.5 cubic feet per hour at a pressure of 1000 millimeters of mercury through the feed line to the interior of the tube. The gas was formed into a carbon vapor in the tube which vapor was deposited uniformly as pyrolytic graphite on the interior surface of the tube as it flowed through the tube at a pressure of approximately 0.5 millimeter of mercury. Under the above conditions, a pyrolytic graphite layer of 0.6 mil thickness was formed on the interior surface of the tube after about 11 minutes. This layer was the first pyrolytic graphite electrode of the subsequent capacitor.

The flow of methane gas was then stopped, the temperature was maintained at an uncorrected optical pyrometer temperature reading of about 1650° C., and a boron and nitrogen component gas in the form of boron trichloride in gaseous form was supplied at a rate of 0.05 cubic feet per hour to the feed line to the interior of the tube. A second feed line supplied ammonia at a rate of 0.15 cubic feet per hour to the interior of the tube. These gases were mixed in the interior of the heated tube. The gases were formed into a vapor in the tube which vapor was deposited uniformly as boron nitride on the interior surface of the tube as it flowed through the tube at a pressure of approximately 0.175 millimeter of mercury. Under these conditions, a pyrolytic boron nitride body of 0.5 mil thickness was formed on the surface of each of the pyrolytic graphite layers. The deposition time was 15 minutes.

The flow of boron trichloride and ammonia was then stopped, the temperature was maintained at 1650° C., and the other initial conditions for the deposition of pyrolytic graphite were then employed. Methane was flowed again under its initial conditions through the feed line to the tube to deposit a second layer of pyrolytic graphite on the surface of the pyrolytic boron nitride layer. Under these conditions, a second pyrolytic graphite layer of 0.7 mil thickness was formed on the surface of the pyrolytic boron nitride layer after about 15 minutes.

The gas flow was then stopped, the pressure was decreased further and the assembly within the casing was allowed to cool to room temperature. The pressure was increased subsequently to atmospheric pressure and the cover was removed from the casing to provide access to the tube. The coated tube was then removed from the casing. The layered structure of pyrolytically-deposited material was then removed from the interior surface of the tube by etching away chemically the tube in a concentrated solution of sulfuric acid. Each of these layered structures comprised a first layer of pyrolytic graphite, a layer of pyrolytic boron nitride thereon, and a second layer of pyrolytic graphite thereon and was then machined to the desired size to provide a plurality of capacitors.

The edges of the pyrolytic graphite layers were etched away by the oxidizing whereby the boron nitride layer extends over the edges of the pyrolytic graphite layers to prevent arcing therebetween. A pair of leads were then affixed to the pyrolytic graphite layers of electrodes. Thus, a pyrolytically deposited capacitor structure was provided by this method.

EXAMPLE II

Apparatus was set up in accordance with FIGURE 3 of the drawing wherein the deposition tube was composed of commercial graphite. The cover was bolted to the casing and the chamber defined by the deposition tube was reduced to a pressure of 0.010 millimeter of mercury by the pump. Power was supplied which heated the tube and tube passage to an uncorrected optimal pyrometer temperature reading of about 1925° C. A carbonaceous gas in the form of methane was supplied at a rate of 0.5 cubic feet per hour at a pressure of 1000 millimeters of mercury through the feed line to the interior of the tube. The gas was formed into a carbon vapor in the tube which vapor was deposited uniformly as pyrolytic graphite on the interior surface of the tube as is flowed through the tube at a pressure of approximately 0.5 millimeter of mercury. Under the above conditions, a pyrolytic graphite layer of 6 mil thickness was formed on the interior surface of the tube after about 124 minutes. This layer was the first pyrolytic graphite electrode of the subsequent capacitor.

The flow of methane gas was then stopped, the temperature, which had dropped during the initial deposition, was at an uncorrected optical pyrometer temperature reading of about 1660° C., and a boron and nitrogen component gas in the form of boron trichloride in gaseous form was supplied at a rate of 0.1 cubic feet per hour to the feed line to the interior of the tube. A second feed line supplied ammonia at a rate of 0.3 cubic feet per hour to the interior of the tube. These gases were mixed in the interior of the heated tube. The gases were formed into a vapor in the tube which vapor was deposited uniformly as boron nitride on the interior surface of the tube as it flowed through the tube at a pressure of approximately 0.3 millimeter of mercury. Under these conditions, a pyrolytic boron nitride body of 1.0 mil thickness was formed on the surface of the pyrolytic graphite layer. The deposition time was 10 minutes.

The flow of boron trichloride and ammonia was then stopped, the temperature was maintained at 1660° C., and the other initial conditions for the deposition of pyrolytic graphite were then employed. Methane was flowed again under its initial conditions through the feed line to the tube to deposit a second layer of pyrolytic graphite on the surface of the pyrolytic boron nitride layer. Under these conditions, a second pyrolytic graphite layer of 9 mil thickness was formed on the surface of the pyrolytic boron nitride layer after about 240 minutes.

The gas flow was then stopped, the pressure was decreased further and the assembly within the casing was allowed to cool to room temperature. The pressure was increased subsequently to atmospheric pressure and the cover was removed from the casing to provide access to the tube. The coated tube was then removed from the casing. The layered structure of pyrolytically-deposited material was then removed from the interior surface of the tube by etching away chemically the tube in a concentrated solution of sulfuric acid. Each of these layered structures comprised a first layer of pyrolytic graphite, a layer of pyrolytic boron nitride thereon, and a second layer of pyrolytic graphite thereon and was then machined to the desired size to provide a plurality of capacitors.

The edges of the pyrolytic graphite layers were etched away by the oxidizing whereby the boron nitride layer extends over the edges of the pyrolytic graphite layers to prevent arcing therebetween. A pair of leads were then affixed to the pyrolytic graphite layers or electrodes. Thus, a pyrolytically deposited capacitor structure was provided by this method.

EXAMPLE III

Apparatus was set up in accordance with FIGURE 3 of the drawing wherein the deposition tube was composed of commercial graphite. The cover was bolted to the casing and the chamber defined by the deposition tube was reduced to a pressure of 0.010 millimeter of mercury by the pump. Power was supplied which heated the tube and tube passage to an uncorrected optimal pyrometer temperature reading of about 1450° C. A carbonaceous gas in the form of methane was supplied at a rate of 0.5 cubic feet per hour at a pressure of 1000 millimeters of mercury through the feed line to the interior of the tube. The gas was formed into a carbon vapor in the tube which vapor was deposited uniformly as pyrolytic graphite on the interior surface of the tube as it flowed through the tube at a pressure of approximately 0.5 millimeter of mercury. Under the above conditions, a pyrolytic graphite layer of 1.2 mil thickness was formed on the interior surface of the tube after about 190 minutes. This layer was the first pyrolytic graphite electrode of the subsequent capacitor.

The flow of methane gas was then stopped, the temperature was maintained at an uncorrected optical pyrometer temperature reading of about 1450° C., and a boron and nitrogen component gas in the form of boron trichloride in gaseous form was supplied at a rate of 0.1 cubic feet per hour to the feed line to the interior of the tube. A second feed line supplied ammonia at a rate of 0.3 cubic feet per hour to the interior of the tube. These gases were mixed in the interior of the heated tube. The gases were formed into a vapor in the tube which vapor was deposited uniformly as boron nitride on the interior surface of the tube as it flowed through the tube at a pressure of approximately 0.115 millimeter of mercury. Under these conditions, a pyrolytic boron nitride body of 0.3 mil thickness was formed on the surface of the pyrolytic graphite layer. The deposition time was 5 minutes.

The flow of boron trichloride and ammonia was then stopped, the temperature was maintained at 1450° C., and the other initial conditions for the deposition of pyrolytic graphite were then employed. Methane was flowed again under its initial conditions through the feed line to the tube to deposit a second layer of pyrolytic graphite on the surface of the pyrolytic boron nitride layer. Under these conditions, a second pyrolytic graphite layer of 0.9 mil thickness was formed on the surface of the pyrolytic boron nitride layer after about 132 minutes.

The gas flow was then stopped, the pressure was decreased futher and the assembly within the casing was allowed to cool to room temperature. The pressure was increased subsequently to atmospheric pressure and the cover was removed from the casing to provide access to the tube. The coated tube was then removed from the casing. The layered structure of pyrolytically-deposited material was then removed from the interior surface of the tube by etching away chemically the tube in a concentrated solution of sulfuric acid. Each of these layered structures comprised a first layer of pyrolytic graphite, a layer of pyrolytic boron nitride thereon, and a second layer of pyrolytic graphite thereon and was then machined to the desired size to provide a plurality of capacitors.

The edges of the pyrolytic graphite layers were etched away by the oxidizing whereby the boron nitride layer extends over the edges of the pyrolytic graphite layers to vent arcing therebetween. A pair of leads were then affixed to the pyrolytic graphite layers or electrodes. Thus, a pyrolytically-deposited capacitor structure was provided by this method.

While other modifications of this invention and variations of method which may be employed within the scope of the invention have not been described, the invention is intended to include such that may be embraced within the following claims.

What I claim as new and desire to secure by Letters Patent of the United States is:

1. In a capacitor device having two or more electrically conducting elements separated from one another by dielectric material, the improvement comprising pyrolytic graphite and pyrolytic boron nitride in combination in the form of alternate layers consisting essentially of pyrolytic graphite separated by a layer consisting essentially of pyrolytic boron nitride.

2. The improvement substantially as recited in claim 1 wherein the edges of each pyrolytic boron nitride layer present extends beyond the respective edges of the adjacent pyrolytic graphite layers.

References Cited

UNITED STATES PATENTS

| | | | |
|---|---|---|---|
| 1,960,944 | 5/1934 | Knudsen | 317—260 |
| 2,841,508 | 7/1958 | Roup | 317—258 X |
| 3,004,197 | 10/1961 | Rodriguez | 317—260 X |
| 3,018,427 | 1/1962 | Marbury | 317—260 X |

FOREIGN PATENTS

| | | |
|---|---|---|
| 123,619 | 12/1944 | Australia. |
| 357,510 | 9/1931 | Great Britain. |
| 908,860 | 10/1962 | Great Britain. |

OTHER REFERENCES

The Condensed Chemical Dictionary Sixth Edition, Reinhold, New York, 1962, pp. 550–551.

LEWIS H. MYERS, *Primary Examiner.*

ROBERT K. SCHAEFER, LARAMIE E. ASKIN, E. GOLDBERG, *Assistant Examiners.*